(12) United States Patent
Kishi (10) Patent No.: US 7,621,844 B2
(45) Date of Patent: Nov. 24, 2009

(54) SHIFT CONTROL DEVICE FOR VEHICLE TRANSMISSION

(75) Inventor: Satoshi Kishi, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 409 days.

(21) Appl. No.: 11/739,170

(22) Filed: Apr. 24, 2007

(65) Prior Publication Data
US 2007/0254775 A1  Nov. 1, 2007

(30) Foreign Application Priority Data
Apr. 27, 2006  (JP) .............................. 2006-122782

(51) Int. Cl.
*F16H 59/48* (2006.01)
(52) U.S. Cl. ........................... 477/120; 477/78; 477/80; 477/115
(58) Field of Classification Search ................... 477/43, 477/77, 78, 79, 80, 115, 118, 120; 74/339, 74/340
See application file for complete search history.

(56) References Cited

U.S. PATENT DOCUMENTS

| 6,679,134 | B2 * | 1/2004 | Shigyo ...................... 74/336 R |
| 7,500,932 | B2 * | 3/2009 | Katakura et al. ............. 475/123 |
| 2006/0080020 | A1 * | 4/2006 | Iriyama et al. ................ 701/54 |

FOREIGN PATENT DOCUMENTS

JP  04-282066  10/1992

* cited by examiner

*Primary Examiner*—David D. Le
(74) *Attorney, Agent, or Firm*—Global IP Counselors, LLP (57) ABSTRACT

A shift control device is provided for a vehicle transmission having first and second clutches arranged to be selectively engaged when one of gear ranges in first and second gear groups, respectively, is selected. The shift control device includes a rotational speed detecting section, a deceleration detecting section, a rotational speed estimating section, a gear determining section and a pre-shifting section. The rotational speed estimating section is configured to determine an estimated rotational speed of a drive source after downshifting based on a current rotational speed and a deceleration rate. The pre-shifting section is configured to control the vehicle transmission to achieve a waiting state before switching engagement states of the first and second clutches to obtain a next gear range when the next gear range is on a downshift side of a current gear range and the estimated rotational speed is lower than a first prescribed rotational speed.

10 Claims, 4 Drawing Sheets

SHIFT CONTROL DEVICE FOR VEHICLE TRANSMISSION

CROSS-REFERENCE TO RELATED APPLICATIONS

This application claims priority to Japanese Patent Application No. 2006-122782, filed on Apr. 27, 2006. The entire disclosure of Japanese Patent Application No. 2006-122782 is hereby incorporated herein by reference.

BACKGROUND OF THE INVENTION

1. Field of the Invention

The present invention generally relates to a shift control device for a vehicle transmission. More specifically, the present invention relates to a shift control device configured to execute a pre-shift operation to control the transmission to achieve a shift waiting state for a next gear range before switching engagement states of clutches of the transmission during shifting.

2. Background Information

Japanese Laid-Open Patent Publication No. 4-282066 discloses a conventional shift control device for controlling a transmission having a first clutch corresponding to one group of gears and a second clutch corresponding to another group of gears. When shifting from one gear to an adjacent gear, the shift control device executes a pre-shift operation in which the next gear is selected from the gear group whose clutch is released (disconnected) and the selected next gear is put into a shift waiting state before switching the engagement states of the first clutch and the second clutch. The pre-shift direction (i.e., upshift or downshift) is determined using a preset pre-shift map and the pre-shift operation is executed to put the selected gear into a waiting state so that the upshift or downshift can be accomplished by switching the engagement states of the first and second clutches.

In view of the above, it will be apparent to those skilled in the art from this disclosure that there exists a need for an improved shift control device for vehicle transmission. This invention addresses this need in the art as well as other needs, which will become apparent to those skilled in the art from this disclosure.

SUMMARY OF THE INVENTION

With the conventional shift control device described in the above mentioned reference, there are times when the pre-shift direction opposes the actual shift direction requested by the driver because the pre-shift operation is executed based on an operating point of the vehicle, which is determined based on a throttle opening degree and a vehicle speed. When this occurs, the transmission must be returned to neutral from the pre-shifted gear and then pre-shifted again in the correct direction for achieving the desired gear. This reversal of the pre-shift direction causes the shift process to require extra time.

The present invention was conceived in view of this problem and one object of the present invention is to provide a transmission shift control device that can shorten the time required for shifting by preventing changes in the pre-shift direction.

In order to achieve the aforementioned object, a shift control device is provided for a vehicle transmission having a plurality of gear ranges grouped into first and second gear groups, a first clutch configured and arranged to be engaged when one of the gear ranges in the first gear group is selected, and a second clutch configured and arranged to be engaged when one of the gear ranges in the second gear group is selected. The shift control device includes a rotational speed detecting section, a deceleration detecting section, a rotational speed estimating section, a gear determining section and a pre-shifting section. The rotational speed detecting section is configured and arranged to detect a current rotational speed of a drive source of a vehicle. The deceleration detecting section is configured and arranged to detect a deceleration rate of the vehicle. The rotational speed estimating section is configured to determine an estimated rotational speed of the drive source after downshifting based on the current rotational speed and the deceleration rate. The gear determining section is configured to determine a next gear range to be used from one of the first and second gear groups corresponding to one of the first and second clutches that is being released. The pre-shifting section is configured to control the vehicle transmission to achieve a waiting state before switching engagement states of the first and second clutches to obtain the next gear range when the next gear range is on a downshift side of a current gear range and the estimated rotational speed is determined to be lower than a first prescribed rotational speed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
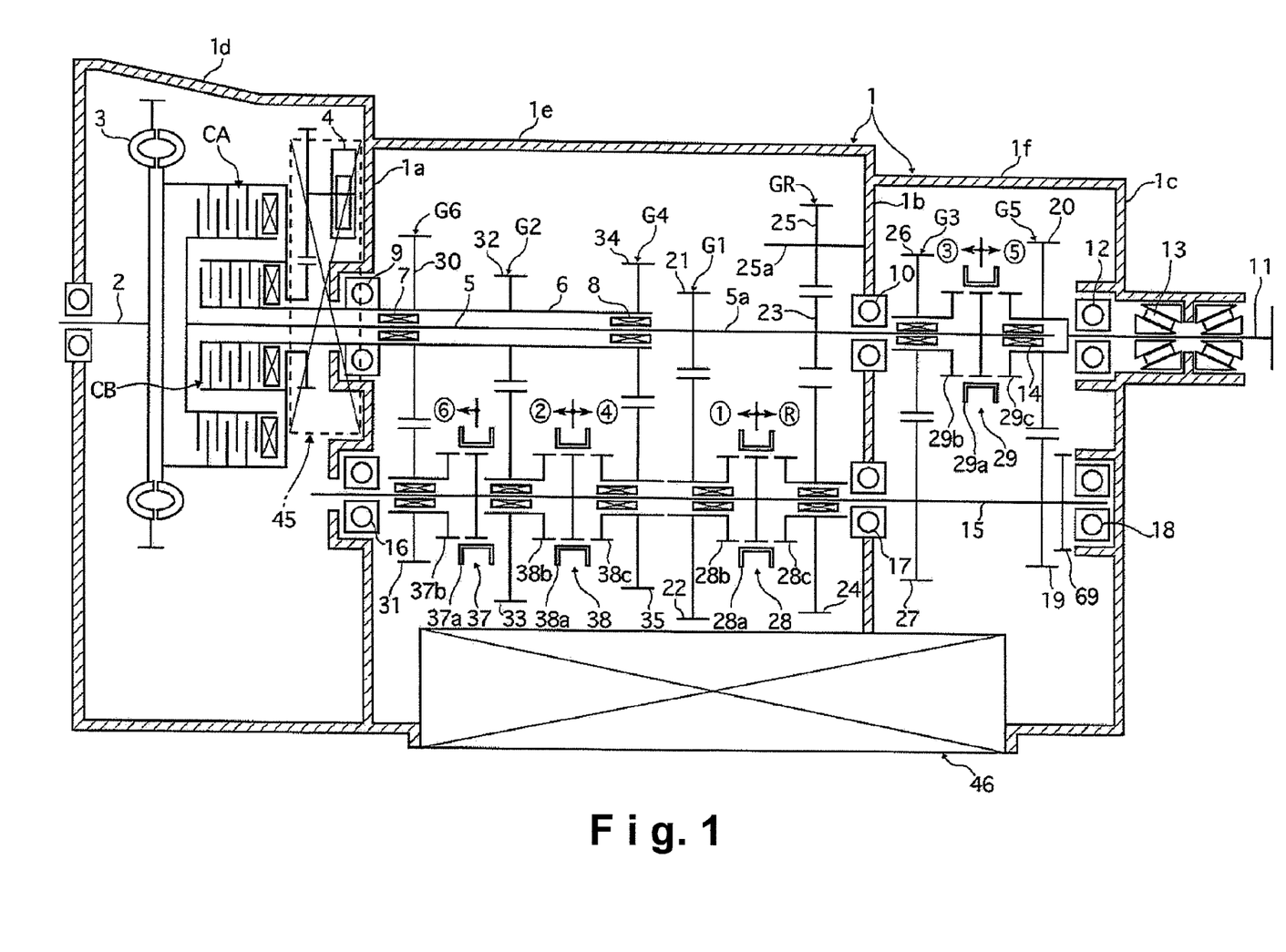
FIG. 1 is a skeleton diagram illustrating an example of a twin-clutch automated manual transmission provided with a shift control device in accordance with a preferred embodiment of the present invention.
Figure 2:
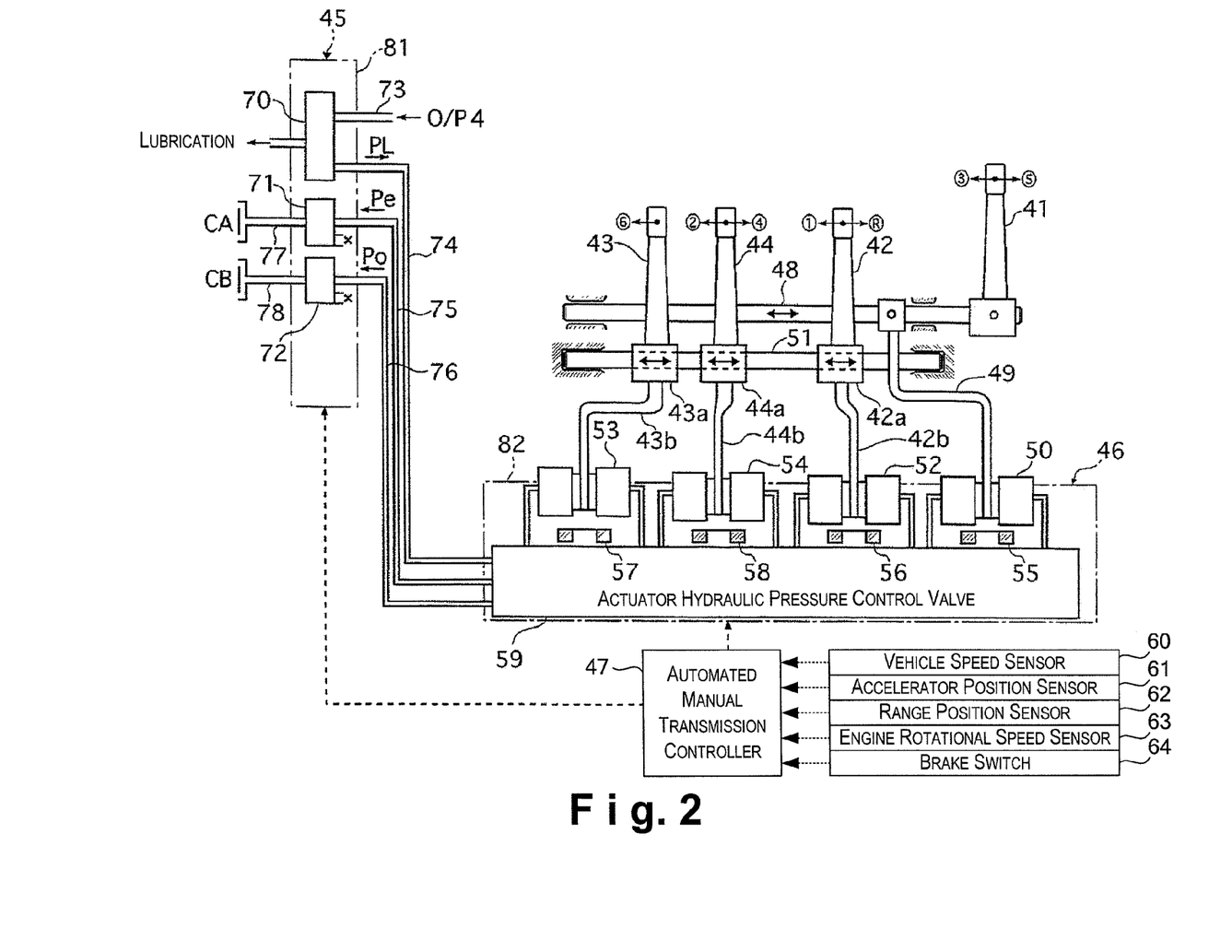
FIG. 2 is a control system diagram showing a gear changing hydraulic control system and an electronic control system of the twin-clutch automated manual transmission provided with the shift control device in accordance with the illustrated embodiment of the present invention.

Referring initially to FIGS. 1 and 2, a twin-clutch (dual-clutch) automated manual transmission provided with a shift control device is illustrated in accordance with a preferred embodiment of the present invention.

Twin-Clutch Automated Manual Transmission

FIG. 1 is a skeleton diagram showing the twin-clutch automated manual transmission provided with the shift control device of the embodiment of the present invention. The constituent features of the input section and input and output shafts of the twin-clutch automated manual transmission will now be explained.

Generally, a manual transmission is efficient and structurally simple. However, the manual transmission requires a driver to perform all operations for changing gears. An automated manual transmission is a transmission that retains the structure of a manual transmission while incorporating a mechanism to automate the gear changing operations.

With a conventional automated manual transmission, a clutch is disengaged temporarily in order to execute a change of gears and the resulting interruption of torque occurring during gear changing feels odd to a driver. The twin-clutch automated manual transmission was developed in order to alleviate this odd feeling and is provided with a second clutch in addition to the clutch provided on a conventional automated manual transmission. The twin-clutch automated manual transmission suppresses the torque interruption by reversing (switching) the connection states of the two clutches (i.e., connecting one clutch and disconnecting the other).

As shown in FIG. 1, the twin-clutch automated manual transmission includes a transmission case 1, a drive input shaft 2, a torsional damper 3, an oil pump 4, a first transmission input shaft 5, a second transmission input shaft 6, a transmission output shaft 11, a counter shaft 15, a first control valve unit 45 and a second control valve unit 46. The transmission further includes a first clutch CA and a second clutch CB arranged in an input section of the transmission. The first clutch CA is connected or engaged when one of a plurality of gear ranges (e.g., first speed, third speed, fifth speed and reverse) included in an odd number gear group (first gear group) is selected and the second clutch CB is connected when one of a plurality of gear ranges (e.g., second speed, fourth speed, and sixth speed) included in an even number gear group (second gear group) is selected. The drive sides of both of the first and second clutches CA and CB are connected to the drive input shaft 2 through the torsional damper 3 as shown in FIG. 1. The drive input shaft 2 is configured and arranged to receive a rotary drive force (torque) from an engine or other drive source that is connected to an input side of the drive input shaft 2.

When one of the odd numbered gear ranges is selected, the first clutch CA is engaged such that the driven side thereof transfers the rotary drive torque of the engine or other drive source to the first transmission input shaft 5. On the other hand, when one of the even numbered gear ranges is selected, the second clutch CB is engaged such that the driven side thereof transfers the rotary drive torque of the engine or other drive source to the second transmission input shaft 6. The first and second clutches CA and CB are operatively coupled to the first control valve unit 45 that will be explained in more detail below with reference to FIG. 2.

The oil pump 4 is driven by the engine at all times and the oil discharged from the oil pump 4 serves as a hydraulic pressure source for controlling connection and release of the clutches CA and CB and for controlling selection of the gear ranges by operating the second control valve unit 46 (FIG. 2). The excess oil from the oil pump 4 is delivered as lubricating oil to parts where lubrication is required.

As shown in FIG. 1, the second transmission input shaft 6 is arranged as a hollow shaft and the first transmission input shaft 5 is arranged as a solid shaft. The second transmission input shaft 6 is coaxially supported on the first transmission input shaft 5 with a front needle bearing 7 and a rear needle bearing 8 such that the second transmission input shaft 6 can rotate freely with respect to the first transmission input shaft 5.

Moreover, the second transmission input shaft 6 is supported on a ball bearing 9 such that the second transmission input shaft 6 can rotate freely with respect to a frontward end wall 1a of the transmission case 1 as shown in FIG. 1. The first transmission input shaft 5 includes a rearward end portion 5a that protrudes from the rearward end of the second transmission input shaft 6. The protruding rearward end portion 5a of the first transmission input shaft 5 passes through an intermediate wall 1b of the transmission case 1 and is supported on a ball bearing 10 such that the first transmission input shaft 5 can rotate freely with respect to the intermediate wall 1b.

The transmission output shaft 11 is arranged coaxially at the rearward end portion 5a of the first transmission input shaft 5. The transmission output shaft 11 is rotatably supported on a rear end wall 1c of the transmission case 1 with a tapered roller bearing 12 and an axial bearing 13 as shown in FIG. 1. The transmission output shaft 11 rotatably supports the rearward end portion 5a of the first transmission input shaft 5 through a needle bearing 14.

The counter shaft 15 is arranged parallel to the first transmission input shaft 5, the second transmission input shaft 6, and the transmission output shaft 11. The counter shaft 15 is rotatably supported on the frontward end wall 1a, the intermediate wall 1b, and the rear end wall 1c of the transmission case 1 with a plurality of roller bearings 16, 17, and 18, respectively.

As shown in FIG. 1, a gear changing mechanism of the twin-clutch automated manual transmission is arranged as a constant-mesh transmission having a synchromesh mechanism. The twin-clutch automated manual transmission has a plurality of gear sets (gear pairs) having different tooth count ratios to achieve six forward gear ranges (speeds) and one reverse gear range.

More specifically, as shown in FIG. 1, the counter shaft 15 includes a park gear 69 and a counter gear 19 provided integrally on the rearward end of the counter shaft 15. The transmission output shaft 11 includes an output gear 20. The counter gear 19 and the output gear 20 are meshed together such that the rotation of the counter shaft 15 is transmitted to the transmission output shaft 11. The counter gear 19 and the output gear 20 also constitute a gear set G5 for fifth gear (fifth speed).

Moreover, a plurality of gear sets G1, G3 and GR of the odd numbered gear ranges (first speed, third speed, and reverse, respectively) is arranged between the rearward end portion 5a of the first transmission input shaft 5 and the counter shaft 15 such that the first speed gear set G1 is located the closest toward the front (the input side) of the transmission, the reverse gear set GR is located farther toward the rear (the output side), and the third speed gear set G3 is located still farther toward the rear.

The first speed gear set G1 includes a first speed input gear 21 provided on the rearward end portion 5a of the first transmission input shaft 5 and a first speed output gear 22 provided on the counter shaft 15. The first speed input gear 21 and the first speed output gear 22 are arranged so as to be intermeshed with each other.

The reverse gear set GR includes a reverse input gear 23 provided on the rearward end portion 5a of the first transmission input shaft 5, a reverse output gear 24 provided on the counter shaft 15, and a reverse idler gear 25 that meshes with both of the reverse input gear 23 and the reverse output gear 24. The reverse idler gear 25 is rotatably supported on a reverse idler shaft 25a. As shown in FIG. 1, the reverse idler shaft 25a is arranged to protrude from the intermediate wall 1b of the transmission case 1.

The third speed gear set G3 includes a third speed input gear 26 provided on rearward end portion 5a of the first transmission input shaft 5 and a third speed output gear 27 provided on the counter shaft 15. The third speed input gear 26 and the third speed output gear 27 are arranged so as to be intermeshed with each other.

A 1-R synchromesh mechanism 28 is provided on the counter shaft 15 between the first speed gear set G1 and the reverse gear set GR. The 1-R synchromesh mechanism 28 includes a coupling sleeve 28a and a pair of clutch gears 28b and 28c. The clutch gear 28b is coupled to the first speed output gear 22 and the clutch gear 28c is coupled to the reverse output gear 24. When the coupling sleeve 28a of the 1-R synchromesh mechanism 28 is moved leftward (toward the input side) from the neutral position shown in FIG. 1 until a spline engagement is achieved with respect to the clutch gear 28b, the rotation of the first speed output gear 22 can be transferred to the counter shaft 15 and the first speed can be selected. When the coupling sleeve 28a of the 1-R synchromesh mechanism 28 is moved rightward (toward the output side) from the neutral position shown in FIG. 1 until a spline engagement is achieved with respect to the clutch gear 28c, the rotation of the reverse output gear 24 can be transferred to the counter shaft 15 and reverse can be selected.

A 3-5 synchromesh mechanism 29 is provided on the rearward end portion 5a of the first transmission input shaft 5 between the third speed gear set G3 and the output gear 20. The 3-5 synchromesh mechanism 29 includes a coupling sleeve 29a and a pair of clutch gears 29b and 29c. The clutch gear 29b is coupled to the third speed input gear 26 and the clutch gear 29c is coupled to the output gear 20. When the coupling sleeve 29a of the 3-5 synchromesh mechanism 29 is moved leftward (toward the input side) from the neutral position shown in FIG. 1 until a spline engagement is achieved with respect to the clutch gear 29b, the rotation of the third speed input gear 26 can be transferred to the first transmission input shaft 5 and the third speed can be selected. When the coupling sleeve 29a of the 3-5 synchromesh mechanism 29 is moved rightward (toward the output side) from the neutral position shown in FIG. 1 until a spline engagement is achieved with respect to the clutch gear 29c, the rotation of the first transmission input shaft 5 can be transferred to the output gear 20 and the fifth speed can be selected.

A plurality of gear sets G2, G4 and G6 of the even numbered gear ranges (second speed, fourth speed, and sixth speed, respectively) is arranged between the second transmission input shaft 6 and the counter shaft 15 such that the sixth speed gear set G6 is located the closest toward the front (the input side) of the transmission, the second speed gear set G2 is located farther toward the rear (the output side), and the fourth speed gear G4 set is located still farther toward the rear.

The sixth speed gear set G6 includes a sixth speed input gear 30 provided on the second transmission input shaft 6 and a sixth speed output gear 31 provided on the counter shaft 15. The sixth speed input gear 30 and the sixth speed output gear 31 are arranged so as to be intermeshed with each other.

The second speed gear set G2 includes a second speed input gear 32 provided on the second transmission input shaft 6 and a second speed output gear 33 provided on the counter shaft 15. The second speed input gear 32 and the second speed output gear 33 are arranged so as to be intermeshed with each other.

The fourth speed gear set G4 includes a fourth speed input gear 34 provided on the second transmission input shaft 6 and a fourth speed output gear 35 provided on the counter shaft 15. The fourth speed input gear 34 and the fourth speed output gear 35 are arranged so as to be intermeshed with each other.

A 6-N synchromesh mechanism 37 is provided on the counter shaft 15 beside the sixth speed gear set G6. The 6-N synchromesh mechanism 37 includes a coupling sleeve 37a and a clutch gear 37b. The clutch gear 37b is coupled to the sixth speed output gear 31. When the coupling sleeve 37a of the 6-N synchromesh mechanism 37 is moved leftward (toward the input side) from the neutral position shown in FIG. 1 until a spline engagement is achieved with respect to the clutch gear 37b, the rotation of the sixth speed output gear 31 can be transferred to the counter shaft 15 and the sixth speed can be selected.

A 2-4 synchromesh mechanism 38 is provided on the counter shaft 15 between the second speed gear set G2 and the fourth speed gear set G4. The 2-4 synchromesh mechanism 38 includes a coupling sleeve 38a and a pair of clutch gears 38b and 38c. The clutch gear 38b is coupled to the second speed output gear 33 and the clutch gear 38c is coupled to the fourth speed output gear 35. When the coupling sleeve 38a of the 2-4 synchromesh mechanism 38 is moved leftward (toward the input side) from the neutral position shown in FIG. 1 until a spline engagement is achieved with respect to the clutch gear 38b, the rotation of the second speed output gear 33 can be transferred to the counter shaft 15 and the second speed can be selected. On the other hand, when the coupling sleeve 38a of the 2-4 synchromesh mechanism 38 is moved rightward (toward the output side) from the neutral position shown in FIG. 1 until a spline engagement is achieved with respect to the clutch gear 38c, the rotation of the fourth speed output gear 35 can be transferred to the counter shaft 15 and the fourth speed can be selected.

The 1-R synchromesh mechanism 28, the 3-5 synchromesh mechanism 29, the 6-N synchromesh mechanism 37 and the 2-4 synchromesh mechanism 38 are operatively coupled to the second control valve unit 46 that will be explained in more detail below with reference to FIG. 2.

Gear Changing Hydraulic Control System and Electronic Control System

FIG. 2 is a control system diagram showing the gear changing hydraulic control system and electronic control system of the twin-clutch automated manual transmission illustrated in FIG. 1 equipped with the shift control device in accordance with the embodiment of the present invention.

As shown in FIG. 2, the gear changing hydraulic control system and electronic control system of the twin-clutch automated manual transmission include the first control valve unit 45, the second control valve unit 46 and an automated manual transmission controller 47 (shift control device). The second control valve unit 46 includes a 3-5 shift actuator 50, a 1-R shift actuator 52, a 6-N shift actuator 53 and a 2-4 shift actuator 54 that are operatively coupled to a 3-5 shift fork 41, a 1-R shift fork 42, a 6-N shift fork 43 and a 2-4 shift fork 44, respectively. Moreover, the second control valve unit 46 further includes a 3-5 shift position sensor 55, a 1-R shift position sensor 56, a 6-N shift position sensor 57 and a 2-4 shift position sensor 58. The second control valve unit 46 also includes a actuator hydraulic pressure control valve 59.

The 3-5 shift fork 41 engages with the coupling sleeve 29a of the 3-5 synchromesh mechanism 29 (FIG. 1). Moreover, the 3-5 shift fork 41 is fixedly coupled to a first shift rod 48. The first shift rod 48 is supported by the frontward end wall 1a and the intermediate wall 1b of the transmission case 1 (FIG. 1) in such a manner that the first shift rod 48 can move in the axial direction. A 3-5 shift bracket 49 is fixed to the first shift rod 48 and an end part of the 3-5 shift bracket 49 is movably supported on a spool coupling shaft of the 3-5 shift actuator 50. Thus, the 3-5 shift fork 41 is moved to the left (when third speed is selected) or right (when fifth speed is selected) from the neutral position shown in FIG. 2 in accordance with the spool operation of the 3-5 shift actuator 50.

The 1-R shift fork 42 engages with the coupling sleeve 28a of the 1-R synchromesh mechanism 28. The 1-R shift fork 42 is arranged on a second shift rod 51 in such a manner that the 1-R shift fork 42 can be moved along the axial direction with respect to the second shift rod 51. The second shift rod 51 is supported by the frontward end wall 1a and the intermediate wall 1b of the transmission case 1 (FIG. 1) in such a manner that the second shift rod 51 cannot move (is fixed) in the axial direction. The 1-R shift fork 42 has a bracket cylinder part 42a and a bracket arm part 42b that are formed as an integral unit. An end part of the bracket arm part 42b is movably supported on a spool coupling shaft of the 1-R shift actuator 52. Thus, the 1-R shift fork 42 is moved to the left (when first speed is selected) or right (when reverse is selected) from the neutral position shown in FIG. 2 in accordance with the spool operation of the 1-R shift actuator 52.

The 6-N shift fork 43 engages with the coupling sleeve 37a of the 6-N synchromesh mechanism 37. The 6-N shift fork 43 is arranged on the second shift rod 51 in such a manner that the 6-N shift fork 43 can be moved along the axial direction with respect to the second shift rod 51, which is fixed with respect to the transmission case 1 (FIG. 1). The 6-N shift fork 43 has a bracket cylinder part 43a and a bracket arm part 43b that are formed as an integral unit. An end part of the bracket arm part 43b is movably supported on a spool coupling shaft of the 6-N shift actuator 53. Thus, the 6-N shift fork 43 is moved to the left (when sixth speed is selected) from the neutral position shown in FIG. 2 in accordance with the spool operation of the 6-N shift actuator 53.

The 2-4 shift fork 44 engages with the coupling sleeve 38a of the 2-4 synchromesh mechanism 38. The 2-4 shift fork 44 is arranged on the second shift rod 51 in such a manner that the 2-4 shift fork 44 can be moved along the axial direction with respect to the second shift rod 51, which is fixed with respect to the transmission case 1 (FIG. 1). The 2-4 shift fork 44 has a bracket cylinder part 44a and a bracket arm part 44b that are formed as an integral unit. An end part of the bracket arm part 44b is movably supported on a spool coupling shaft of the 2-4 shift actuator 54. Thus, the 2-4 shift fork 44 is moved to the left (when second speed is selected) or right (when fourth speed is selected) from the neutral position shown in FIG. 2 in accordance with the spool operation of the 2-4 shift actuator 54.

As shown in FIG. 2, the first control valve unit 45 includes a first valve body 81 having a line pressure solenoid valve 70, a first clutch pressure solenoid valve 71, and a second clutch pressure solenoid valve 72. The line pressure solenoid valve 70 is configured and arranged to adjust the line pressure PL based on the discharge oil from the oil pump 4 (FIG. 1) to the first valve body 81. The first clutch pressure solenoid valve 71 is configured and arranged to produce a clutch control pressure for the first clutch CA based on an even numbered gear pressure Pe from the actuator hydraulic pressure control valve 59. The actuator hydraulic pressure control valve 59 is configured to produce an actuator operating pressure for the shift actuators 50, 52, 53 and 54. The second clutch pressure solenoid valve 72 is configured and arranged to produce a clutch control pressure for the second clutch CB based on an odd numbered gear pressure Po from the actuator hydraulic pressure control valve 59.

The oil pump 4 (FIG. 1) and the line pressure solenoid valve 70 are connected by a pump hydraulic oil passage 73. The line pressure solenoid valve 70 and the actuator hydraulic pressure control valve 59 are connected by a line hydraulic oil passage 74. The first clutch pressure solenoid valve 71 and the actuator hydraulic pressure control valve 59 are connected by an even numbered gear hydraulic oil passage 75. The second clutch pressure solenoid valve 72 and the actuator hydraulic pressure control valve 59 are connected by an odd numbered gear hydraulic oil passage 76.

The first clutch pressure solenoid valve 71 and the clutch oil chamber of the first clutch CA are connected by a first clutch hydraulic oil passage 77. A first pressure sensor (not shown) is provided in the first clutch hydraulic oil passage 77. The second clutch pressure solenoid valve 72 and the clutch oil chamber of the second clutch CB are connected by a second clutch hydraulic oil passage 78. A second pressure sensor (not shown) is provided in the second clutch hydraulic oil passage 78.

As shown in FIG. 2, the 3-5 shift actuator 50, the 1-R shift actuator 52, the 6-N shift actuator 53, the 2-4 shift actuator 54, the 3-5 shift position sensor 55, the 1-R shift position sensor 56, the 6-N shift position sensor 57, the 2-4 shift position sensor 58, and the actuator hydraulic pressure control valve 59 of the second control valve unit 46 are housed in a second valve body 82 as a single integral unit.

The actuator hydraulic pressure control valve 59 is configured and arranged to produce the even numbered gear pressure Pe and the odd numbered gear pressure Po based on the line pressure PL adjusted by the first control valve unit 45. The actuator hydraulic pressure control valve 59 is also configured and arranged to supply an actuator operating pressure to the respective gear change hydraulic oil passages leading to the shift actuators 50, 52, 53, and 54 in accordance with the selected gear (speed).

The controller 47 is operatively coupled to a vehicle speed sensor 60, an accelerator pedal position sensor 61, a range position sensor 62, an engine speed sensor 63 (rotational speed detecting section), and a brake switch 64 to receive information. The controller 47 is configured to issue clutch connection control commands (including line pressure control commands) to the valve solenoids of the first control valve unit 45. The controller 47 is also configured to send gear selection control commands to the valve solenoids of the actuator hydraulic pressure control valve 59.

The controller 47 preferably includes a microcomputer with a pre-shift control program that controls the twin-clutch automated manual transmission as discussed below. The controller 47 can also include other conventional components such as an input interface circuit, an output interface circuit, and storage devices such as a ROM (Read Only Memory) device and a RAM (Random Access Memory) device. The microcomputer of the controller 47 is programmed to control the first and second control valve units 45 and 46. The memory circuit stores processing results and control programs such as ones for pre-shifting operation that are run by the processor circuit. The controller 47 is operatively coupled to the first and second control valve units 45 and 46 in a conventional manner. The internal RAM of the controller 47 stores statuses of operational flags and various control data. The internal ROM of the controller 47 stores the prescribed data and programs for various operations. The controller 47 is capable of selectively controlling any of the components of the control system in accordance with the control program. It will be apparent to those skilled in the art from this disclosure that the precise structure and algorithms for the controller 47 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Arrangement of Control Valve Units

The arrangement of the first control valve unit 45 and the second control valve unit 46 will now be described. The clutch control valves 70, 71 and 72 for controlling the clutches CA and CB provided in the transmission input section of the transmission case 1 are arranged in positions nearby the clutches CA and CB. The clutch control valves 70, 71 and 72 are hydraulic pressure control valves configured to produce hydraulic pressures to be delivered to hydraulically operated gear changing elements during gear shifting.

As shown in FIG. 1, the first control valve unit 45 including the clutch control valves 70, 71 and 72 are arranged beside the clutches CA and CB provided in the input section of the transmission in a position at least the same height as the first and second clutches CA and CB.

The valve body of the hydraulic pressure control valves is divided into the first valve body 81 housing the clutch control valves 70, 71, and 72 and the second valve body 82 housing the actuator hydraulic pressure control valve 59, which is configured and arranged to control the gear ratio of the gear changing mechanism. The clutch control valves 70, 71 and 72 and the first valve body 81 constitute the first control valve unit 45, and the actuator hydraulic pressure control valve 59 and the second valve body 82 constitute the second control valve unit 46. The first control valve unit 45 and the second control valve unit 46 are arranged in different positions of the transmission case 1.

As shown in FIG. 1, the transmission case 1 is divided into a clutch case section 1*d*, a first gear changing mechanism case section 1*e*, and a second gear changing mechanism case section 1*f*. The clutch case section 1*d* houses the oil pump 4 and the first and second clutches CA and CB that are provided in the input section of the transmission. The first gear changing mechanism case section 1*e* and the second gear changing mechanism case section 1*f* house the gear train. The first control valve unit 45 is arranged in a side position of the clutch case section 1*d*, and the second control valve unit 46 is arranged in a bottom position of the first and second gear changing mechanism case sections 1*e* and 1*f* as shown in FIG. 1.

Control Flow of Pre-Shift Operation

Figure 3:
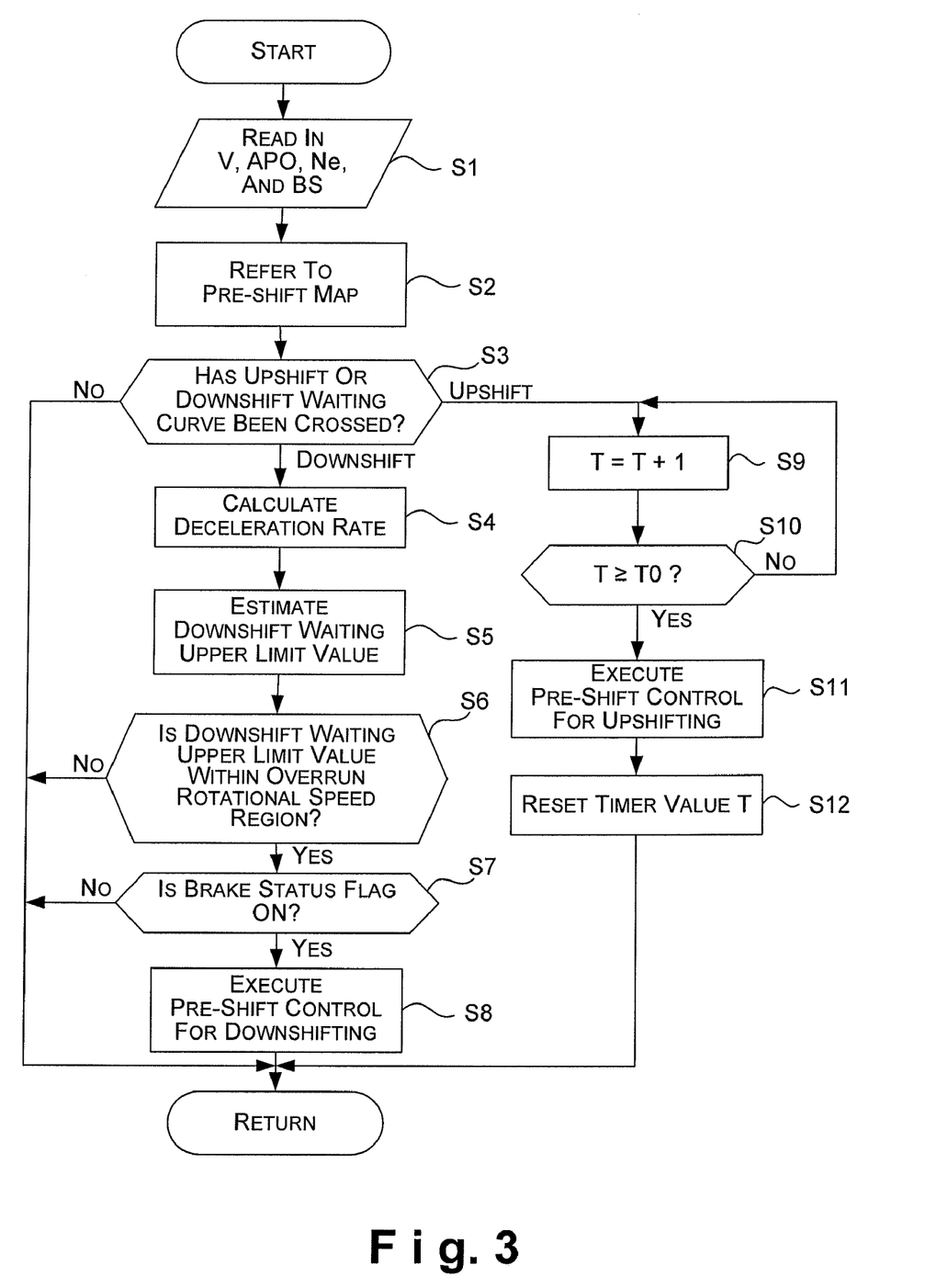
FIG. 3 is a flowchart showing a control flow of the pre-shift control operations executed when a circuit mode serving as an automatic shifting mode is selected by an automated manual transmission controller in accordance with the illustrated embodiment of the present invention.

FIG. 3 is a flowchart showing the control flow of the pre-shift control operations executed by the controller 47. In the pre-shift control, the controller 47 is configured to control the twin-clutch automated manual transmission to achieve a waiting state for a next gear range before switching engagement states of the first clutch CA and the second clutch CB to obtain the next gear range. More specifically, the controller 47 is configure to selectively control the shift actuators 50, 52, 53 and 54 to operate one of the synchromesh mechanisms 28, 29, 37 and 38 so that one of the gear sets G1, G2, G3, G4, G5 and G6 corresponding to the next gear range will be engaged with the transmission output shaft 11 upon switching of the engagement states of the first and second clutches CA and CB.

In this embodiment of the present invention, the control flow illustrated in FIG. 3 is preferably executed when a circuit mode (track mode) as an automatic shifting mode is selected by an automated manual transmission controller 47. The steps of the flowchart (executed by the shift control device) will now be explained referring to FIG. 3.

In step S1, the controller 47 is configured to read in a vehicle speed V, an accelerator position APO, an engine speed Ne, a brake switch signal BS, and other required information from the various sensors (e.g., the vehicle speed sensor 60, the accelerator pedal position sensor 61, the range position sensor 62, the engine speed sensor 63, and the brake switch 64).

In step S2, the controller 47 is configured to determine a current operating point of the engine on a prescribed pre-shift map. The pre-shift map is configured and arranged to be used when the circuit mode (automatic shifting mode) is selected. The operating point is determined based on the vehicle speed V and the accelerator position APO. The controller 47 is also configured to determine how the operating point has changed in comparison with a previous operating point that existed n control cycles prior to the current control cycle. The controller 47 is then configured to proceed to step S3.

Figure 4:
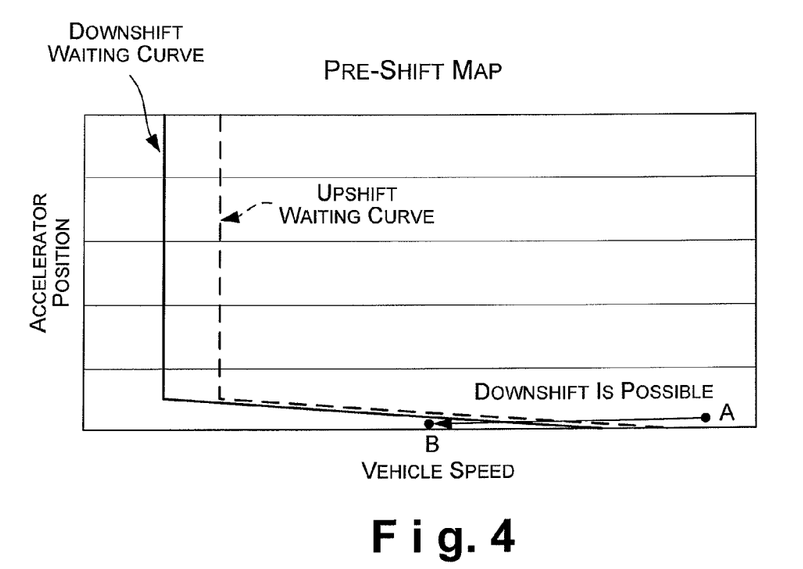
FIG. 4 is a simplified schematic diagram illustrating an example of a pre-shift map used for shift control based on a vehicle speed and an accelerator position in accordance with the illustrated embodiment of the present invention.

The pre-shift map for the circuit mode is configured to have, for example, a downshift waiting curve and an upshift waiting curve contrived to have a hysteretic relationship, as shown in FIG. 4. FIG. 4 shows an example of the pre-shift map for determining whether to downshift or upshift from one particular gear range (speed). The controller 47 is provided with a similar pre-shift map for each of the gear ranges.

In step S3, the controller 47 is configured to determine if the change in the operating point (from the previous operating point to the current operating point) on the pre-shift map determined based on the vehicle speed V and the accelerator position APO has crossed the downshift waiting curve, crossed the upshift waiting curve, or crossed neither of the waiting curves (the gear determining section). The controller 47 is configured to proceed to step S4 if the change in the operating point has crossed the downshift waiting curve. The controller 47 is configured to proceed to step S9 if the change in the operating point has crossed the upshift waiting curve. The controller 47 is configured to end this control cycle and return if the change in the operating point crosses neither the downshift waiting curve nor the upshift waiting curve.

Crossing of the downshift waiting curve occurs when, for example, the vehicle speed V and the accelerator position APO change such that the operating point moves from a position on the right side of the downshift waiting curve shown in FIG. 4 to a position on the left side of the downshift waiting curve. In such a case, the vehicle is likely to require downshifting from the current gear.

In step S4, the controller 47 is configured to calculate the deceleration rate of the vehicle (the deceleration detecting section), and then the controller 47 proceeds to step S5. The deceleration rate of the vehicle is calculated based on at least one of the engine rotational speed Ne, the output rotational speed, the gear shaft rotational speed, and the vehicle speed V by executing a differentiation processing contrived to compute an amount of change in rotational speed in a prescribed amount of time.

Figure 5:
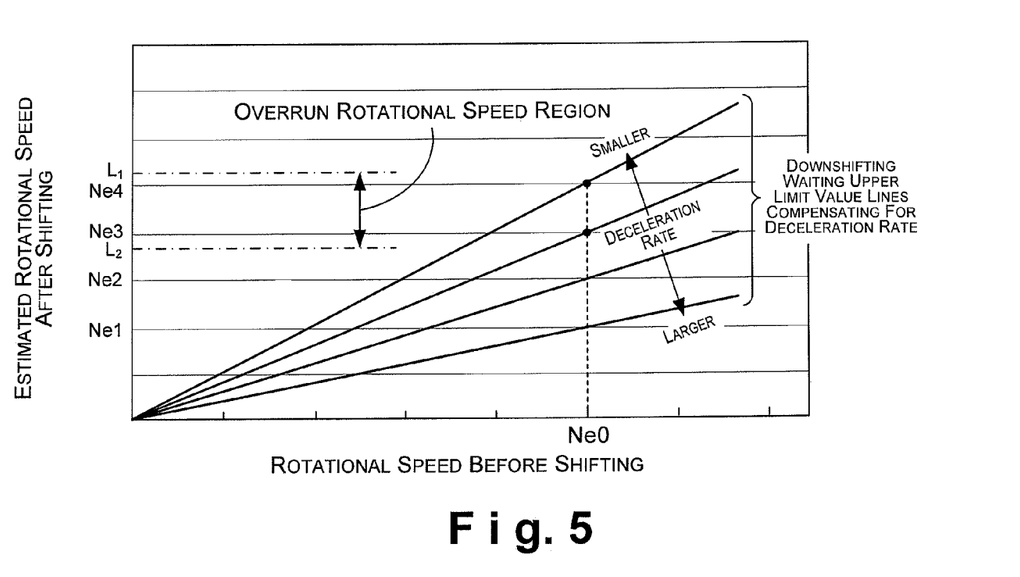
FIG. 5 is a simplified schematic diagram illustrating an example of a graph plotting downshift waiting upper limit value lines used to execute shift control according to an estimated engine rotational speed after shifting and an engine rotational speed before shifting in accordance with the illustrated embodiment of the present invention.

In step S5, the controller 47 is configured to estimate a downshift waiting upper limit value of the engine rotational speed (i.e., an estimated engine rotational speed after downshifting) based on the current engine rotational speed (i.e., the engine rotational speed before shifting) and the deceleration rate of the vehicle (the rotational speed estimating section). The controller 47 is then configured to proceed to step S6. The downshift waiting upper limit value is an estimated value of what the engine rotational speed will be after downshifting. The downshift waiting upper limit value is calculated in step S5 by taking into account the fact that the larger the deceleration rate of the vehicle is, the lower the engine rotational speed will be after downshifting. For example, as shown in FIG. 5, when the engine rotational speed is Ne0 before shifting, the estimated value of what engine rotational speed will be after shifting ranges from Ne1 in the case of a large deceleration rate to Ne4 in the case of a small deceleration rate. Thus, the estimated values (the estimated engine rotational speeds) have the relationship Ne4>Ne3>Ne2>Ne1 in accordance with the magnitude of the deceleration rate. In FIG. 5, the slopes of the downshift waiting upper limit value lines vary depending on the magnitude of the deceleration rate. The downshift waiting upper limit value lines are used to execute shift control in accordance with the embodiment of the present invention.

In step S6, the controller 47 is configured to determine if the downshift waiting upper limit value (the estimated engine rotational speed) determined in step S5 falls within a prescribed engine rotational speed region (prescribed output characteristics region) in which a requested or desired engine output characteristics is achieved. More specifically, in the illustrated embodiment, an overrun rotational speed region of the engine is set as the prescribed output characteristic region (FIG. 5). In this embodiment, the overrun rotational speed region is defined between an overrun rotational speed upper limit $L_1$ (first prescribed rotational speed) (i.e., excessive engine revving threshold value) and an overrun rotational speed lower limit $L_2$ (second prescribed rotational speed). The overrun rotational speed region is a region in which a large engine output can be obtained. The overrun rotational speed region lies below a rotational speed region of excessive revving. Thus, in step S6, the controller 47 is configured to determine whether the downshift waiting upper limit value is within a range between the overrun rotational speed upper limit $L_1$ and the overrun rotational speed lower limit $L_2$. If the downshift waiting upper limit value estimated in step S5 falls within the overrun rotational speed region (Yes in step S6), then the controller 47 proceeds to step S7. If the downshift waiting upper limit value estimated in step S5 does not fall within the overrun rotational speed region (No in step S6), then the controller 47 is configured to end the current control cycle.

In the example shown in FIG. 5, if the downshift waiting upper limit value is Ne4 or Ne3, the controller 47 is configured to determine that the downshift waiting upper limit value is in the overrun rotational speed region of the engine. On the other hand, if the downshift waiting upper limit value is Ne2 or Ne1, the controller 47 is configured to determine that the downshift waiting upper limit value is outside the overrun rotational speed region of the engine.

If the downshift waiting upper limit value is found to be in the overrun rotational speed region in step S6, in step S7 the controller 47 is configured to determine if a brake status flag is ON (the brake operation detecting section). The controller 47 proceeds to step S8 if the brake status flag is ON (Yes in step S7). On the other hand, the controller 47 is configured to end the current control cycle if the brake status flag is not ON (No in step S7). The brake status flag turns on when the brake switch turns from OFF to ON, when the brake fluid pressure raises to or above a set pressure, or when the brake is moved through a stroke distance equal to or larger than a set stroke.

If the brake status flag is determined to be ON in step S7, in step S8 the controller 47 is configured to execute a pre-shift operation to prepare for downshifting (the pre-shifting section) and end the current control cycle.

Referring back to step S3, if the change in the operating point has crossed the upshift waiting curve in step S3, the controller 47 is configured to proceed to step S9. In step S9, the controller 47 is configured to increment a timer value T using the equation T=T+1. Then, the controller 47 proceeds to step S10. In step S10, the controller 47 is configured to determine whether the timer value T is equal to or larger than a predetermined timer value T0 (T≧T0) (the timer section). If the timer value T is smaller than the predetermined timer value T0 (T<T0), then the controller 47 is configured to return to step S9 to increment the timer value T. If the timer value T is equal to or larger than the predetermined timer value T0 (T≧T0), the controller 47 is configured to proceed to step S11.

If the controller 47 determines in step S10 that the current timer value T is equal to or larger than the predetermined timer value T0, the controller 47 is configured to execute a pre-shift operation in preparation for upshifting in step S11 (the pre-shifting section). Then, the controller 47 proceeds to step S12.

In step S12, the controller 47 is configured to reset the timer value T and end the current control cycle.

With this twin-clutch automated manual transmission, when the transmission is shifted from the current gear range to an adjacent gear range, a pre-shift operation (in preparation for downshifting or upshifting) is executed before the engagement states of the first clutch CA and the second clutch CB are reversed. The pre-shift operation is contrived to select the next gear range from among a group of gear ranges corresponding to one of the first and second clutches CA and CB that is being released. More specifically, the pre-shift operation is contrived to operate the corresponding one of the shift forks 41, 42, 43 and 44 in the appropriate direction to obtain the selected gear range before shift control is executed to reverse the connection states of the first clutch CA and the second clutch CB. As a result, the gear can be shifted (either downshifted or upshifted) without an interruption of torque.

The shift control devices of conventional twin-clutch automated manual transmissions are configured to determine the pre-shift direction (downshift or upshift) and to execute pre-shifting in either the downshift direction or upshift direction (to achieve a downshift waiting state or upshift waiting state) based on a prescribed shift map. The conventional shift control device is thus configured and arranged to execute a pre-shift operation when the position of the vehicle operating point (which is determined based on the accelerator position and the vehicle speed) moves so as to cross over a downshift waiting curve or an upshift waiting curve of the shift map. Consequently, in situations where the changes in the accelerator position and the vehicle speed are large, such as during track driving or sporty driving, it is possible for the direction of the pre-shift to be opposite the shift direction desired by the driver. When the transmission is pre-shifted in the incorrect direction, it must be returned to the neutral position from the incorrectly pre-shifted gear and then pre-shifted again to the gear desired by the driver, thus causing the shifting process to require extra time. With the conventional shift control device, this problem occurs sporadically. As a result, there is variance in the time required for shifting and the vehicle cannot be driven precisely in accordance with the intent of the driver.

On the other hand, with the twin-clutch automated manual transmission equipped with the shift control device in accordance with the embodiment of the present invention, discrepancy between the pre-shift direction and the actual shift direction can be prevented and the output characteristic of the drive source can be used to the maximum degree. As a result, the vehicle can be driven in a manner that conforms to the intent of the driver.

More specifically, when downshifting is executed while a circuit mode or track mode that emphasizes drive efficiency is selected, the rotational speed of the engine after downshifting will be lower than the overrun rotational speed region if the deceleration is large. Consequently, the vehicle cannot be driven in a manner that utilizes the engine characteristic to the maximum degree. The shift control device in accordance with the embodiment of the present invention addresses this issue by estimating the downshift waiting upper limit value (i.e., the estimated rotational speed the engine will have after downshifting) based on the current engine rotational speed and the deceleration rate of the vehicle. Then, the shift control device is configured and arranged to execute the pre-shift operation in preparation for downshifting (to achieve the downshifting waiting state) only when the change in the vehicle operating point on the pre-shift map selected when driving in the circuit mode crosses over the downshift waiting curve and when the estimated downshift waiting upper limit value is in the overrun rotational speed region of the engine.

In the shift control device in accordance with the embodiment of the present invention, the downshift waiting upper limit value is estimated using the deceleration rate. Thus, the condition for pre-shifting in preparation for downshifting is not merely that the operating point must cross over the downshift waiting curve in the pre-shift map. Instead, the additional condition that the downshift waiting upper limit value (i.e., the estimate value of the rotational speed the engine will have after downshifting) must not exceed an excessive engine revving threshold value (first prescribed value) is also included. As a result, when it is estimated that the engine rotational speed after downshifting will exceed the excessive engine revving threshold value, the shift control device does not execute pre-shifting in preparation for downshifting, and thus, an unnecessary change in the pre-shift direction can be prevented.

On the other hand, if the downshift waiting upper limit value is in a region where the desired engine output characteristic can be obtained, i.e., if the downshift waiting upper limit value condition is satisfied, the shift control device executes the pre-shift and then, afterwards, executes downshifting by reversing the connection state of the clutches. Consequently, the engine output characteristic can be utilized to the maximum degree because, for example, downshifting can be executed up to the borderline of the overrun rotational speed region of the engine, i.e., just below the excessive engine revving threshold value (the overrun rotational speed upper limit $L_1$).

Thus, discrepancy between the pre-shift direction and the actual shift direction can be prevented and the output characteristic of the drive source can be used to the maximum degree. As a result, the vehicle can be driven in a manner that conforms to the intent of the driver.

The pre-shift control operation, the operational effects of pre-shift control in preparation for downshifting, and the operational effects of pre-shift control in preparation for upshifting will now be explained with respect to the shift control device in accordance with the embodiment of the present invention adapted to be used in the twin-clutch automated manual transmission.

Pre-Shift Control Operation

When the change in the operating point determined based on the vehicle speed V and the accelerator position APO crosses over neither the downshift waiting curve nor the upshift waiting curve on the pre-shift map, the controller 47 is configured to execute steps S1, S2 and S3, and to end the current control cycle shown in the flowchart of FIG. 3. Thus, in such case, the controller 47 does not execute pre-shifting in preparation for downshifting or upshifting.

When the change in the operating point determined based on the vehicle speed V and the accelerator position APO crosses over the downshift waiting curve on the pre-shift map (e.g., FIG. 4) and the downshift waiting upper limit value is outside the overrun rotational speed region, the controller 47 is configured to execute steps S1, S2, S3, S4, S5 and S6, and to end the current control cycle shown in the flowchart of FIG. 3. Thus, in this case, the controller 47 does not execute pre-shifting control in preparation for downshifting.

When the change in the operating point determined based on the vehicle speed V and the accelerator position APO crosses over the downshift waiting curve on the pre-shift map (e.g., FIG. 4) and the downshift waiting upper limit value (the estimated rotational speed) is within the overrun rotational speed region but the brake status flag is off, the controller 47 is configured to execute steps S1, S2, S3, S4, S5, S6 and S7, and to end the current control cycle shown in the flowchart of FIG. 3. Thus, in this case, the controller 47 does not execute pre-shifting control in preparation for downshifting.

When the change in the operating point determined based on the vehicle speed V and the accelerator position APO crosses over the downshift waiting curve on the pre-shift map (e.g., FIG. 4), the downshift waiting upper limit value (the estimated rotational speed) is within the overrun rotational speed region, and the brake status flag is ON, the controller 47 is configured to execute steps S1, S2, S3, S4, S5, S6, S7 and S8, and to end the current control cycle shown in the flowchart of FIG. 3. Thus, in this case, the controller 47 executes pre-shifting control in preparation for downshifting.

When the change in the operating point determined based on the vehicle speed V and the accelerator position APO crosses over the upshift waiting curve on the pre-shift map (e.g., FIG. 4), the controller 47 is configured to execute steps S1, S2, S3, S9, and S10. Steps S9 and S10 are repeated until the time condition of step S10 is satisfied (i.e., until the predetermined period of time elapses since the change in the operating point determined based on the vehicle speed V and the accelerator position APO crosses over the upshift waiting curve). When the time condition of step S10 is satisfied, the controller 47 is configured to proceed to steps S10, S11 and S12, and to end the current control cycle shown in the flowchart of FIG. 3. Thus, in this case, the controller 47 executes pre-shifting control in preparation for upshifting.

Operations of Pre-Shift Control in Preparation for Downshifting

As explained above, pre-shifting control in preparation for downshifting is executed when the change in the operating point has crossed over the downshift waiting curve on the pre-shift map (step S3), the downshift waiting upper limit value is within the overrun rotational speed region (step S6), and the brake status flag is ON (step S7).

In the conventional shift control device, when the drive source of the vehicle is an engine, downshifting is executed in such a manner that excessive revving of the engine does not occur (i.e., such that the rotational speed of the engine does not become excessively high). However, if the deceleration rate of the vehicle is large, the rotational speed of the engine after downshifting will be below the overrun rotational speed of the engine, which corresponds to high engine output. In short, when downshifting is executed while the deceleration rate is large, the vehicle cannot be driven in such a manner that the engine characteristic is utilized to the maximum degree.

On the other hand, with the embodiment of the present invention, the downshift waiting upper limit value for the engine speed after downshifting is estimated using the vehicle deceleration rate (step S5) and a condition regarding the downshift waiting upper limit value (step S6) is imposed in addition to the condition requiring the change in the operating point to have crossed over the downshift waiting curve (step S3). As a result, if the condition regarding the downshift waiting upper limit value is not satisfied, the pre-shift control in preparation for downshifting is not executed and discrepancy between the pre-shift direction and the actual shift direction can be prevented.

Furthermore, even if the estimated downshift waiting upper limit value is within a region where the desired engine output characteristic can be obtained, i.e., even if the condition regarding the downshift waiting upper limit value (step S6) is satisfied, pre-shifting control in preparation for downshifting is not executed if the condition regarding the brake status (step S7) is not satisfied.

By adding the brake status condition (step S7), unnecessary changes in the pre-shift direction (i.e., from upshift waiting state to downshift waiting state) can be prevented in situations where the transmission is in a low gear and large changes in acceleration and deceleration are occurring due to depression and release of the accelerator pedal (thus, the brake status condition serves as a countermeasure against rough driving).

The brake status condition also prevents unnecessary changes of the pre-shift direction during cornering, which involves driving while finely adjusting the accelerator position.

On the other hand, for example, if the operating point changes from point A to point B on the map shown in FIG. 4 such that the condition regarding the operating point on the map (step S3) is satisfied and the condition regarding the downshift waiting upper limit value (step S6) and the condition regarding the brake status (step S7) are also satisfied, the controller 47 is configured to execute pre-shifting control in preparation for downshifting. Then, the controller 47 is configured to execute downshifting by reversing the connection state of the first and second clutches CA and CB.

Consequently, the engine output characteristic can be utilized to the maximum degree because downshifting can be executed up to the borderline of the overrun rotational speed region of the engine. As a result, the vehicle can be driven in accordance with the intent of the driver when the driver has selected a circuit mode that emphasizes drive efficiency.

Operation of Pre-Shift Control in Preparation for Upshifting

As explained above, pre-shifting control in preparation for upshifting is not executed immediately when the condition that the operating point has crossed the upshift waiting curve on the pre-shift map (step S3) is satisfied. Instead, the controller 47 is configured to wait until the timer value T has reached the prescribed value T0.

If the shift control device were configured to execute pre-shifting control in preparation for upshifting immediately when the change in the operating point crossed the upshift waiting curve on the pre-shift map (i.e., when the condition of step S3 was satisfied), then pre-shifting control in preparation for upshifting could be executed during downshift waiting if the change in the operating point crossed the upshift waiting curve while the driver was driving the vehicle around a corner (cornering) and finely adjusting the acceleration by depressing and releasing the accelerator pedal with the transmission in a downshift waiting state. This would result in the pre-shift direction being immediately changed from the downshift waiting state to the upshift waiting state.

On the other hand, with the embodiment of the present invention, after the change in the operating point crosses over the upshift waiting curve on the pre-shift map, the shift control device is configured to wait until the timer value T reaches a prescribed value before executing pre-shifting control in preparation for upshifting. As a result, unnecessary changes of the pre-shift direction can be prevented when the vehicle is cornering while the transmission is in the downshift waiting state and the acceleration is being finely adjusted by depressing and releasing the accelerator pedal.

Although this embodiment of the present invention discloses the shift control device for the twin-clutch automated manual transmission, the specific constituent features are not limited to those of the embodiment illustrated herein.

Moreover, although in the illustrated embodiment the overrun rotational speed region is set to be a constant region, it is also feasible to change the overrun rotational speed region depending on the current gear and/or the traveling conditions. In other words, the excessive engine revving threshold value (which determines an upper limit of the overrun rotational speed region) can be set differently for each gear and varied depending on the traveling conditions. Also, the downshift waiting upper limit value is not limited to be determined based on the engine rotational speed. It is also acceptable for the downshift waiting upper limit value to be determined based on the output rotational speed, the gear shaft rotational speed, the vehicle speed, or another rotational speed of the drive train of the vehicle.

Although the illustrated embodiment presents a case in which the present invention is applied to pre-shifting operation executed in a circuit mode or track mode, the invention is not limited to such an application. It is also acceptable for the present invention to be applied to pre-shifting in a low fuel consumption mode that is designed to emphasize fuel efficiency. In such a case, a region in which optimum fuel efficiency can be obtained is set as the prescribed engine rotational speed region in which the desired engine output characteristic (e.g., optimum fuel efficiency) can be obtained.

The present invention can also be applied to pre-shifting in a snow mode designed to emphasize driving performance on snowy roads and other roads with low friction coefficients. In such a case, a low-torque engine speed region in drive slippage can be suppressed is set as the prescribed engine rotational speed region in which the desired engine output characteristic (e.g., low-torque engine speed for suppressing drive slippage) can be obtained.

Although the illustrated embodiment presents an example in which the present invention is applied to the shift control device for the twin-clutch automated manual transmission installed in the vehicle having the engine as a drive source, it is also acceptable to apply the present invention to the shift control device for a transmission installed in a hybrid vehicle or an electric powered vehicle. In short, the present invention can be applied to any transmission that is configured to accomplish gear changing (downshifting and upshifting) by first executing pre-shifting to put the next gear into a shift waiting state and then changing the engagement state of a plurality of clutches to complete the downshift or upshift.

With the shift control device of the present invention, the estimated rotational speed that the drive source will have after downshifting is estimated based on the current rotational speed of the drive source and the deceleration rate of the vehicle. The pre-shifting in preparation for downshifting (i.e., putting a lower gear range into a shift waiting state) is performed when the change in the operating point crosses over the downshift waiting curve in the pre-shift map and when the estimated rotational speed of the drive source after downshifting is less than the first prescribed rotational speed (below the excessive engine revving threshold value). Thus, the pre-shifting operation to a lower gear is not executed when the estimated rotational speed of the drive source after downshifting is not below the first prescribed rotational speed. Since downshifting is not executed in situations where the rotational speed of the drive source after downshifting would exceed the first prescribed rotational speed and cause excessive revving of the drive source, the pre-shifting operation in preparation for downshifting is also not executed in such a situation with the present invention. As a result, changes in the pre-shift direction can be avoided in situations where the shift request of the driver changes from a downshift request to an upshift request and the time required for shifting can be shortened.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A shift control device for a vehicle transmission having a plurality of gear ranges grouped into first and second gear groups, a first clutch configured and arranged to be engaged when one of the gear ranges in the first gear group is selected, and a second clutch configured and arranged to be engaged when one of the gear ranges in the second gear group is selected, the shift control device comprising:

a rotational speed detecting section configured and arranged to detect a current rotational speed of a drive source of a vehicle;

a deceleration detecting section configured and arranged to detect a deceleration rate of the vehicle;

a rotational speed estimating section configured to determine an estimated rotational speed of the drive source after downshifting based on the current rotational speed and the deceleration rate;

a gear determining section configured to determine a next gear range to be used from one of the first and second gear groups corresponding to one of the first and second clutches that is being released; and a pre-shifting section configured to control the vehicle transmission to achieve a waiting state before switching engagement states of the first and second clutches to obtain the next gear range when the next gear range is on a downshift side of a current gear range and the estimated rotational speed is determined to be lower than a first prescribed rotational speed.

2. The shift control device as recited in claim 1, further comprising a timer section configured to detect whether a prescribed amount of time has elapsed since the next gear range, which is on an upshift side of the current gear range, was determined by the gear selecting section, the pre-shifting section being further configured to control the vehicle transmission to achieve the waiting state when the timer section detects that the prescribed amount of time has elapsed since the next gear range, which is on the upshift side of the current gear range, was determined by the gear selecting section.

3. The shift control device as recited in claim 1, wherein the rotational speed detecting section is further configured to detect a current rotational speed of an engine as the current rotational speed of the drive source of the vehicle, and the rotational speed estimating section is configured to determine an estimated rotational speed of the engine after downshifting as the estimated rotational speed of the drive source based on the current rotational speed of the engine and the deceleration rate.

4. The shift control device as recited in claim 1, wherein the pre-shifting section is further configured to control the vehicle transmission to achieve the waiting state when the next gear range is on the downshift side of the current gear range and the estimated rotational speed is in a range between the first prescribed rotational speed and a second prescribed rotational speed, which is lower than the first prescribed rotational speed.

5. The shift control device as recited in claim 4, further comprising
a brake operation detecting section configured to detect whether a brake device of the vehicle is being operated to apply braking force to the vehicle,
the pre-shifting section being further configured to control the vehicle transmission to achieve the waiting state when the next gear range is on the downshift side of the current gear range, the rotational speed is in the range between the first prescribed rotational speed to the second prescribed rotational speed, and the brake device is being operated.

6. The shift control device as recited in claim 1, wherein the pre-shifting section is further configured to determine whether the next gear range is on the downshift side of the current gear range according to a change in an operating point determined based on a vehicle speed and an accelerator position.

7. The shift control device as recited in claim 6, wherein the pre-shifting section is further configured to set the first prescribed rotational speed to an upper limit rotational speed in a prescribed output characteristics region within which a requested output characteristics of the drive source is achieved with the next gear range.

8. A shift control device for a vehicle transmission having a plurality of gear ranges grouped into first and second gear groups, the shift control device comprising:
rotational speed detecting means for detecting a current rotational speed of a drive source of a vehicle;
deceleration detecting means for detecting a deceleration rate of the vehicle;
rotational speed estimating means for determining an estimated rotational speed of the drive source after downshifting;
gear determining means for determining a next gear range to be used from one of the first and second gear groups that does not include a current gear range; and
pre-shifting means for controlling the transmission to achieve a waiting state for the next gear range before switching from the current gear range to the next gear range when the next gear range is on a downshift side of the current gear range and the estimated rotational speed determined is lower than a first prescribed rotational speed.

9. A shift control method for a vehicle transmission having at least first and second gear ranges, the shift control method comprising:
determining whether a downshifting operation from the first gear range to the second gear range is required based on a vehicle speed and an accelerator position;
determining an estimated rotational speed of a drive source of a vehicle after the downshifting operation based on a current rotational speed of the drive source and a deceleration rate of the vehicle; and
controlling the vehicle transmission to achieve a waiting state for the second gear range before the downshifting operation when the downshifting operation is required and the estimated rotational speed is lower than a prescribed rotational speed.

10. The shift control method recited in claim 9, further comprising
performing the downshifting operation by disengaging a first clutch operatively coupled to the first gear range and engaging a second clutch operatively coupled to the second gear range.

* * * * *